July 21, 1970   J. J. GORDON   3,521,393
ATTACHMENT FOR FISHERMAN'S POLES
Filed July 24, 1968
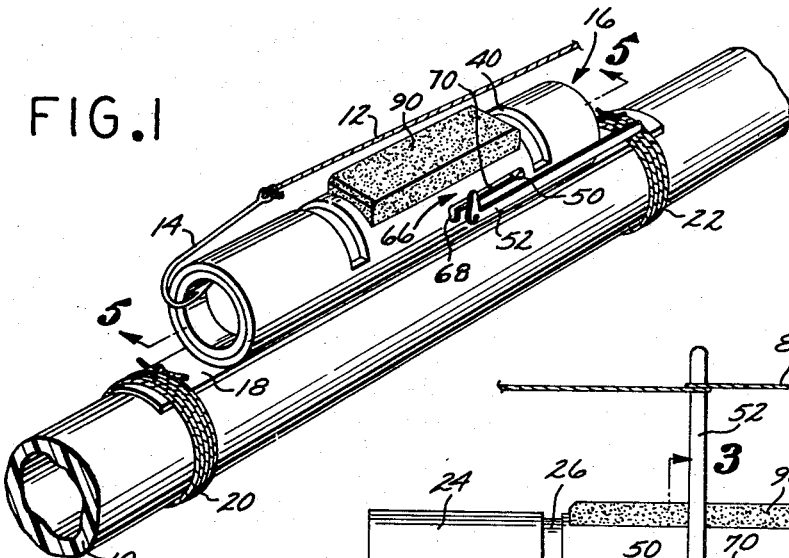
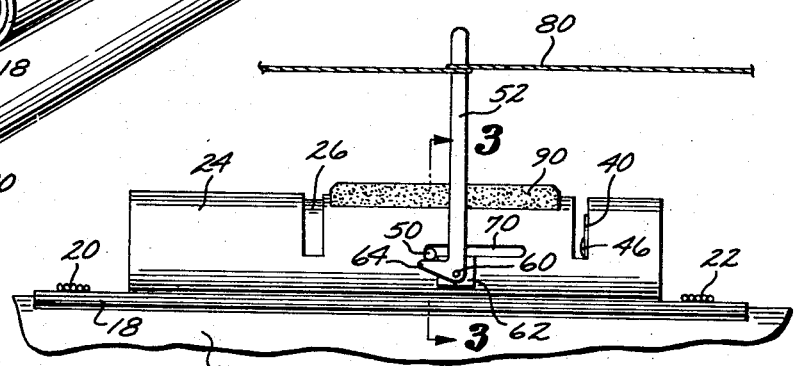
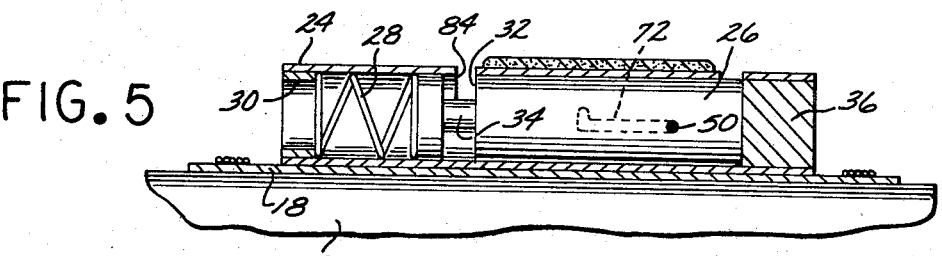
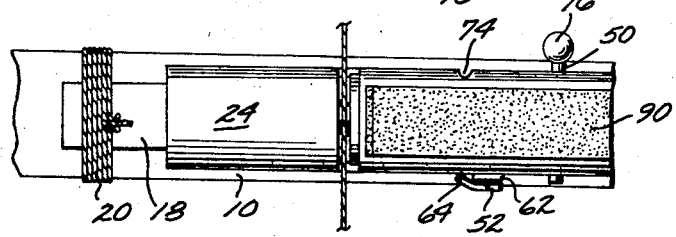
INVENTOR.
JACK J. GORDON
BY
ATTORNEY

United States Patent Office 3,521,393
Patented July 21, 1970

3,521,393
ATTACHMENT FOR FISHERMAN'S POLES
Jack J. Gordon, 2925 Pembra Drive,
Costa Mesa, Calif. 92626
Filed July 24, 1968, Ser. No. 747,294
Int. Cl. A01k 87/00, 97/12
U.S. Cl. 43—17                              10 Claims

ABSTRACT OF THE DISCLOSURE

An attachment for fisherman's poles which comprises a piston and cylinder assembly for attachment along a length of a fishing pole. A spring biases the piston toward one end of the cylinder where it engages an anvil and provides an audible signal. The piston is released to provide the signal by a catch and trip mechanism which is associated with the fishing line. The cylinder wall is slotted to receive a fishing line so that motion of the piston within the cylinder may be used to cut the line. In addition, the cylinder has a form facilitating its use in storing the fish hook without removing the hook from the line, and a surface of the cylinder which is arranged to have a high coefficient of friction to facilitate handling of the attachment serves also as a means for sharpening fish hooks.

---

This invention relates to improvements in paraphernalia for fishing. It relates particularly to an apparatus intended for attachment to a fisherman's pole.

There are a number of tasks and functions which are ancillary to pole fishing which are advantageously accomplished in close proximity to the pole. These functions include the sharpening of hooks, ascertaining when the strike has been made by a fish, preparation of the fishing line, and storing the hook out of harm's way when it is not in the water. All are functionally interrelated but have been performed heretofore by separate tools and apparatus—some of it disassociated from the pole and resulting in less than optimum convenience.

An object of the invention is to provide a unitary structure in which these several functions can be performed easily and efficiently and which can be carried upon the fisherman's pole whereby to maximize convenience. The apparatus provided by the invention is arranged so that its several parts are multifunctional in that each contributes, by the way in which it is coordinated with other parts, to the accomplishment of two or more of those functions.

In large degree the several functions provided in the invention are independent of the considerations involved in the selection of one fishing pole rather than another. Accordingly, an object of the invention is to provide an apparatus which can be readily removed from one pole and attached to another without any loss of function, thus to avoid a need for separate apparatus for each pole. In this connection, it is an object of the invention to provide an apparatus in which the several functions described above are provided in a structure which can be produced at minimum cost and which has a long service life in proportion to its cost.

These, and other objects and advantages of the invention which will hereinafter appear, are realized in part by the provision of a structure which includes a cylinder and piston assembly, the piston of which is mounted for reciprocal movement within the cylinder along the cylinder axis and between one end position and another; by the provision of biasing means for urging the piston to one end position; by the provision of signal means responsive to movement of the piston to that one end position for providing a signal; and by the provision of a catch and trip means which includes a trip member attachable to a fishing line for restraining the piston in the other end position against the urging of the bias means and responsive to a tug of predetermined force by the line on the trip member to release the piston to the action of the biasing means.

The accompanying drawing depicts the best mode now envisioned for practicing the invention but it will be apparent to those skilled in the art upon an examination of the specification and claims hereof that the invention may be embodied in various forms and modifications other than the specific form illustrated in the drawing.

In the drawings:

FIG. 1 is an isometric view of an apparatus incorporating the invention shown affixed to a section of a fisherman's pole together with a portion of a fish line;

FIG. 2 is a view in side elevation of the device shown associated with a fragment of a fishing line and a fragment of a fisherman's pole;

FIG. 3 is a cross-sectional view of the attachment apparatus of FIGS. 1 and 2 taken on line 3—3 of FIG. 2 to illustrate the catch and trip mechanism;

FIG. 4 is a view in side elevation of the attachment element shown associated with a fragment of a fisherman's line and pole in another operating condition of the device;

FIG. 5 is a cross-sectional view of the attachment device taken on line 5—5 of FIG. 1; and FIG. 6 is a top plan view of a fragment of the attachment device and of the fisherman's pole to which it is attached.

In FIG. 1, the numeral 10 designates a length of a fisherman's pole of glass or steel or bamboo and used with a line of fixed length or with a reel or spinner means for adjusting the fishing line length. The numeral 12 designates the end section of a length of fishing line to which a fishing hook 14 is tied. In view of the arrangement of these elements it is clear that the handle end of the fishing pole lies at the left in FIG. 1 and that the tip of the pole lies at the right of the section shown.

An attachment according to the invention is indicated and designated generally by the reference numeral 16. It comprises a cylinder and piston combination together with a means by which they may be removably mounted upon the fisherman's pole. In this embodiment the cylinder is secured by any convenient means, such as by spot welding, to an elongate bar 18 with its axis parallel to the bar such that the bar extends forwardly and rearwardly of the cylinder to expose a portion of the bar ahead of the cylinder and behind it by which the bar may be affixed to the pole. Advantageously, the bar 18 is curved, when viewed from its end, so that the attachment will lie firmly upon the pole and be stable. Means are provided for attaching the bar to the pole at its forward and its rearward ends. This means may comprise a slip ring or may, as shown, comprise lengths of fishing line which are wrapped about the pole and the bar to whip the two together. These lengths of line are identical by the reference numerals 20 and 22.

The attachment unit 16 comprises a cylinder 24 and a piston 26. The piston is mounted within the cylinder and reciprocably movable therein in the direction of the axis of the cylinder. It is not essential to successful practice of the invention that the inner wall of the cylinder be round and that the outer wall of the piston be cylindrical. Other cross-sectional shapes are possible. However, the cylinder 24 is advantageously cylindrical and formed of a length of tubular plastic material or metal. The piston 26 is advantageously cylindrical in shape having an outer diameter only slightly less than the inner diameter of the tubular member 24. In the preferred form shown in the drawing the piston 26 comprises a solid cylindrical rod whose axis is coincident with the axis of the cylinder and which reciprocates within the cylinder in the direction of that axis.

The piston is movable between the limits of one end position and another and means is provided in the invention for urging the piston toward one of those end positions. Advantageously, this means comprises a biasing spring which bears at one end against the piston and which bears at its opposite end against the cylinder. The biasing member is visible in FIG. 5 of the drawing. It comprises a coiled spring 28 which is trapped between one face, the left face in FIG. 5, of the piston 26 and a spring retainer 30 which comprises a short length of tubing of diameter to fit within the wall of a cylinder 24. Retainer 30 is disposed within the cylinder at its left end and is secured in place to the cylinder by any convenient means such, for example, as by being welded thereto.

Near its left end the piston 26 is provided with an annular groove, at least the forward face 32 of which is perpendicular to the axis of the piston. The outer margin of this surface forms a shearing edge for cooperation with an associated edge of the cylinder wall. This edge serves as a means for cutting fish line. That section of the cylinder which has reduced diameter, because of the formation of the recess, is designated by the numeral 34.

The piston 26 is shown in FIG. 5 to occupy the position at the extreme limit of its forward motion. Further motion of the piston is precluded by an anvil 36 which forms a plug in the forward end of the cylinder 24. Means is provided in the invention for providing a signal to indicate that the fishing line has been subjected to a force of some selected amount and more specifically to indicate that a fish has struck the bait and hook at the end of the line. This means may take a variety of forms. In preferred form it produces a hammering sound such as that produced by a piston striking an anvil and in this embodiment the signal is produced when piston 26 is forced forwardly by the spring 28 to strike the anvil 36. If the ambient noise level is excessive, as it might be in a case where the fisherman was engaged in trolling from a motor power boat, an even louder signal may be desirable. To this end the cylinder 24 is slotted perpendicularly to a depth equal approximately to half its diameter at a point just behind the rear face of the anvil 36. This slot is designated by the reference numeral 40 and its purpose is to permit insertion of an explosive cap behind the anvil which will be exploded when the piston moves forward to hammer the cap against the anvil. Paper caps in which a small quantity of black powder is encased between two layers of paper, such as are used in children's toy pistols, are suitable for use in the invention. A cap 46 of this kind is shown lying against the rear face of anvil 36 in FIG. 2 of the drawing.

Means is provided in the invention for holding the piston 26 in a retracted position against the bias of spring 28 and for releasing it to the influence of the bias spring when a pull or tug in predetermined amount is applied to the fishing line with which the device is associated. This means may comprise a catch and trip mechanism employing a trip member to which the fishing line is connected and which will release the piston from its catch when the trip member is actuated manually or by the fishing line. The catch and trip mechanism may have any of a variety of forms. However, the form illustrated in the drawings is advantageously employed. The elements of this mechanism are a pin 50 and an L-shaped lever 52. The cylinder 24 is provided with a pair of L-shaped slots, one on each side of the cylinder, and having their longer arms lying in a common plane which is substantially parallel to the plane of the bar 18 or, stated otherwise, which lie in a common plane perpendicular to the plane containing the longitudinal axes of the cylinder and the fishing pole. The portions of the slots thus described comprise the longer arms. The shorter arms of the two L-shaped slots are formed substantially at right angles to the longer arms. They extend in the same direction of rotation around the periphery of the cylinder for a distance less than half of the circumference of the cylinder and preferably a distance approximately equal to the width of the slot. The L-shaped lever 52 is mounted by a pivot pin 60 upon a spacer block 62, which in turn is formed or mounted upon the exterior wall of the cylinder 24, so that its short arm 64, rotates in an arc in line with the short arm of the slot on one side of the cylinder. In FIGS. 1, 2 and 3 the L-shaped slot at that side of the cylinder 24 which is toward the viewer is designated generally by the reference numeral 66. The long arm of the slot is designated 70 and the short arm designated 68. The slot on the opposite side of the cylinder is visible in FIG. 3 where it is designated by the reference numeral 72. It is identified by a dotted line in FIG. 5 and the short arm of that slot is just visible in FIG. 6 where it is designated by the numeral 74. Means is provided for utilizing those slots to guide movement of the piston 26 and to catch the piston in the short arm sections of the slot to restrain it in retracted position against the bias of spring 28. In the preferred form this means comprises a pin extending from each side of the piston through a respectively associated one of the slots 70 and 72. Advantageously, as shown, these pins comprise a single pin which extends entirely through the piston substantially on a diameter of the piston and substantially perpendicular to the axis of piston movement. The pin 50 is best seen in FIG. 3 where it is shown to have an enlarged ball like portion 76 formed at one end, on the side opposite the trip lever 52, which can be used as a hand hold to retract the piston against the bias of spring 28. The pin 50 extends entirely through the piston and both walls of the cylinder whereby pin and piston movement are confined within the limits imposed by the slots 70 and 72. These slots permit retraction of the piston without rotation relative to the cylinder for the length of the slots. Upon being retracted to the juncture of the long and short segments of the slot, further retraction of the piston is precluded but rotation is permitted in a degree determined by the arc over which the shorter segment of the slot is formed. The pin 50 is secured against axial movement in the piston by any convenient means such, for example, as being press-fitted therein as shown. The end of the pin which extends from that side of the cylinder which is visible in FIGS. 1, 2 and 3, extends sufficiently far so that it may be engaged by the short arm 64 of the L-shaped lever 52 when the pin is fully retracted and is disposed in the short circumferential segments of the slots 66 and 70. This arrangement is best illustrated in FIG. 6 which shows that the short lever arm 64 of the L-shaped lever 52 may be bent inwardly to insure that it will engage the pin when the lever is rotated and when the pin is retracted. This is also seen in an elevational view in FIG. 2. The lever 52 is rotated in the clockwise direction. The arm 64 rotates the end of the pin 50 into alignment with the longer, horizontal portion of the slot. Examination of FIG. 3 will show that the pin itself is not lifted but rather the force exerted on it results in rotation of the piston and the pin to carry the pin out of the short slots 68 and 74 so that the piston may be forced forwardly by the spring 28. This is illustrated in FIG. 4.

The lever 52 may be operated manually but it is intended to be actuated and rotated to release the piston by a force exerted on the fishing line. Another segment designated 80 of the fishing line is shown in FIGS. 2 and 4. This segment of the line is adjacent the end opposite the hook and may be that portion of the line just beyond the reel or spinner mechanism. It is connected by a round turn as shown in FIG. 2 to the lever. A fish striking at the end of the line exerts a force on the line drawing it to the right in FIGS. 2 and 3. When the lever is pulled sufficiently in the clockwise direction, the line will free itself from the lever so that the attachment device imposes no interference whatsoever on manipulation of the fishing pole and its line but this action results in releasing the piston to provide an audible signal indicating that a strike has been made.

Means is provided in the invention for preparing the fishing line by cutting it cleanly and squarely when it is to be cut. The cutting is done by a cooperating pair of shear edge surfaces, one of which has been described. The piston 26 has reduced diameter at the section 34. The forward face of this recess is designated 32 and its outer margin comprises one of the shear surfaces. The other shear surface comprises the inner edge of a slot which is formed through the cylinder wall at a point rearwardly from the position occupied by the surface 32 when the piston 26 has its forward position against the anvil 36. The slot has a width sufficiently great to permit easy insertion of a fishing line and it extends approximately halfway across the diameter of the cylinder. A length of fishing line may be inserted in the slot and held taut in a direction perpendicular to the axis of piston movement. The piston is then retracted manually by application of pressure to the ball 76 so that the surface 32 of the piston is moved rearwardly to pass the shearing edge 84 of the cylinder. This action results in the clipping of a segment of line from the line to be cut. This function is provided with the use of elements, the piston and the cylinder and other elements of the structure, which serve other functions in addition to providing a structure for cutting the line.

As best shown in FIGS. 1 and 5, the cylinder and the spring retainer being cylindrical, an axial opening is provided at the rear end of the attachment device which can accommodate the barbed portion of a fish hook. By leaving this end of the cylinder open, either by inserting nothing in the end or by the insertion of a material into which the barb is easily inserted and from which it is easily withdrawn, a means is provided for storing the fish hook with its barb out of harm's way. The fish hook is hooked over the rear edge of the cylinder with its barb toward the interior of the cylinder and is retained there by tension on the line.

Fishing poles are usually made of a material which is fairly slippery when wet so it is customary to provide the pole with a handle having an increased friction coefficient even when wet. If the attachment device provided by the invention is secured to the pole in the region of the handle then the friction of the handle section will suffice to give the fisherman ample means for controlling his pole. Ordinarily, however, the attachment device herein described will be mounted forwardly of the handle so that it advantageously includes a surface of relatively high friction coefficient whereby to provide the fisherman with a means of control when he grasps the pole in the region of the attachment. To this end a surface of the attachment member is coated or covered with an abrasive material having a high coefficient of friction. In the preferred form of the invention that abrasive material is made sufficiently coarse to provide adequate frictional control. Nonetheless it is made sufficiently fine so that it may also be used for sharpening fish hooks. Accordingly, in the preferred form of the invention an abrasive surface is provided on the cylinder which will serve both as a fish hook sharpening implement and as a frictional member to facilitate holding of the rod. In the embodiment shown an abrasive stone 90 is secured to the cylinder 24 at its upper side between the two slots at 40 and 84.

Although I have shown and described certain specific embodiments of my invention, I am fully aware that many modifications thereof are possible. My invention therefore is not to be restricted except insofar as is necessitated by the prior art.

I claim:

1. An attachment for fishing poles comprising in combination:

a cylinder and piston assembly including a cylinder and a piston mounted for reciprocal movement within said cylinder along its axis between first and second positions;

a biasing means for urging said piston to said first position;

signal means responsive to movement of said piston to said first position for providing a signal; and catch means restraining said piston in said second position against the urging of said biasing means and a trip member responsive to a predetermined force imposed on the trip member to release the piston to the action of said biasing means said catch means including a slot extending through the cylinder wall and having an L-shape such that one arm of the slot extends in the direction of piston movement along the cylinder and the other arm of the slot extends part way around the circumference of the cylinder with a pin on said piston extending through said slot and held in the other arm of the slot, said trip means comprising a pivotable lever mounted on said cylinder and having one portion engaged by a fishing line and another portion positioned adjacent to said pin in said other arm of the slot, said trip means being pivoted by a pull on the line to move the other portion of the lever into engagement with said pin and move the pin from said other arm of the slot to a position in said one arm of the slot.

2. An attachment for fishing poles comprising in combination:

a cylinder and piston assembly including a cylinder and a piston mounted for reciprocal movement within said cylinder along its axis between first and second positions;

a biasing means for urging said piston to said first position;

signal means responsive to movement of said piston to said first position for providing a signal; and catch means for restraining said piston in said second position against the urging of said biasing means and a trip member responsive to a predetermined force imposed thereon to release the piston from the catch means to the action of said biasing means; and in which said piston has one of its ends formed with a shearing edge and in which said sylinder is provided with an opening extending through its wall of size to accommodate a fishing line and formed to provide a shearing edge at the interior surface of said cylinder at a point intermediate the limits of travel of said shearing edge of the piston.

3. An attachment for fishing poles comprising in combination:

a cylinder and piston assembly including a cylinder and a piston mounted for reciprocal movement within said cylinder along its axis between first and second positions;

a biasing means for urging said piston to said first position;

signal means responsive to movement of said piston to said first position for providing a signal; and catch means for restraining said piston in said second position against the urging of said biasing means and a trip member responsive to a predetermined force imposed thereon to release the piston from the catch means to the action of said biasing means; and in which an exterior surface area of said cylinder is covered with an abrasive material having a grit sufficiently coarse to serve as a hand hold against slipping, but sufficiently fine to have utility in sharpening fish hooks.

4. The invention defined in claim 2, in which said cylinder is formed with an abrasive material covering a surface area having a grit sufficiently fine to serve as a medium for sharpening fish hooks, but sufficiently coarse to serve as a hand hold against slippage.

5. The invention defined in claim 1, in which one end of said cylinder is unclosed and capable of receiving the barb of a fish hook disposed in hooked relation over the cylinder wall at said end of the cylinder.

6. The invention defined in claim 4, in which one end of said cylinder is open and capable of receiving the barb of a fish hook disposed in hooked relation over the wall of said cylinder at said end thereof.

7. An attachment for fishing poles comprising in combination:
- a cylinder and piston assembly including a cylinder and a piston mounted for reciprocal movement within said cylinder along its axis between first and second positions;
- a biasing means for urging said piston to said first position;
- signal means responsive to movement of said piston to said first position for providing a signal; and
- catch means for restraining said piston in said second position against the urging of said biasing means and a trip member responsive to a predetermined force imposed thereon to release the piston from the catch means to the action of said biasing means; and
- in which said cylinder is provided with a pair of slots extending through its walls on opposite sides of the cylinder and having portions extending in a direction parallel to the cylinder axis, said slots having an L-shape in that at their corresponding ends both slots continue circumferentially of the cylinder in like direction of rotation for a distance less than half of the circumferential distance of the cylinder; said catch and trip means comprising a pin extending through said piston and through both slots of the piston in a direction such that said pin is moved along said slot as an incident to reciprocal motion of said piston within said cylinder and such that said piston is rotated about its axis as an incident to rotation of said pin in said circumferentially extending portions of said slots, said trip member being effective in response to a predetermined force to rotate said pin and said piston when the pin is disposed within said circumferentially extending portions of said slots to a position in alignment with said portions of said slots which extend in parallel.

8. The invention defined in claim 6, in which said cylinder is provided with a pair of slots extending through its walls on opposite sides of the cylinder having portions extending in a direction parallel to the cylinder axis, said slots having an L-shape in that at their corresponding ends both slots continue circumferentially of the cylinder in like direction of rotation for a distance less than half of the circumferential distance of the cylinder; said catch and trip means comprising a pin extending through said piston and through both slots of the piston in a direction such that said pin is moved along said slot as an incident to reciprocal motion of said piston within said cylinder and such that said piston is rotated about its axis as an incident to rotation of said pin in said circumferentially extending portions of said slots, said trip member being effective in response to a predetermined force to rotate said pin and said piston when the pin is disposed within said circumferentially extending portions of said slots to a position in alignment with said portions of said slots which extend in parallel.

9. An attachment for fishing poles comprising in combination:
- a cylinder and piston assembly including a cylinder and a piston mounted for reciprocal movement within said cylinder along its axis between first and second positions;
- a biasing means for urging said piston to said first position;
- signal means responsive to movement of said piston to said first position for providing a signal; and
- catch means for restraining said piston in said second position against the urging of said biasing means and a trip member responsive to a predetermined force imposed thereon to release the piston from the catch means to the action of said biasing means; and
- in which said signal means comprises an anvil mounted within said cylinder at a point at which it is engaged by said piston as an incident to movement of the piston to said first position.

10. The invention defined in claim 8, in which said signal means comprises an anvil mounted within said cylinder at a point at which it is engaged by said piston as an incident to movement of the piston to said first position.

References Cited
UNITED STATES PATENTS

| | | | |
|---|---|---|---|
| 997,730 | 7/1911 | Aten | 43—19 |
| 1,054,916 | 3/1913 | Gray | 43—19 |
| 1,236,659 | 8/1917 | Bendixen | 43—25.2 |
| 2,170,594 | 8/1939 | Nicholson | 43—17 |
| 2,654,338 | 10/1953 | Deal | 43—17 X |
| 2,749,648 | 6/1956 | Schneider | 43—17 |
| 2,773,494 | 12/1956 | Thompson et al. | |
| 3,026,644 | 3/1962 | Raider | 43—19 |

SAMUEL KOREN, Primary Examiner

D. J. LEACH, Assistant Examiner

U.S. Cl. X.R.

43—25, 25.2